May 24, 1966  H. H. STEWART ETAL  3,252,564
CONVEYOR SYSTEMS

Filed June 15, 1962  6 Sheets-Sheet 1

INVENTORS
Harold H. Stewart
Herman S. Johns

BY Hastings Ackley
and
Walter J. Jag
ATTORNEY

INVENTORS
Harold H. Stewart
Herman S. Johns
BY Hastings Ackley
and
Walter J. Jagn
ATTORNEY May 24, 1966 H. H. STEWART ETAL 3,252,564
CONVEYOR SYSTEMS
Filed June 15, 1962 6 Sheets-Sheet 3
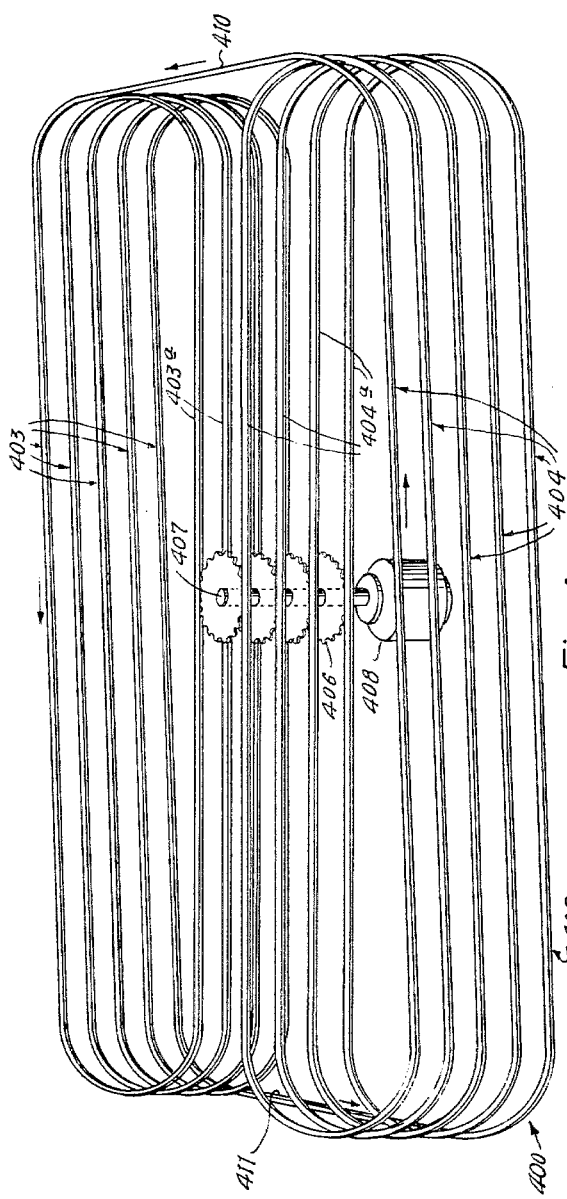
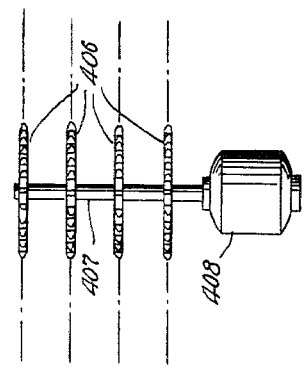
Fig.6
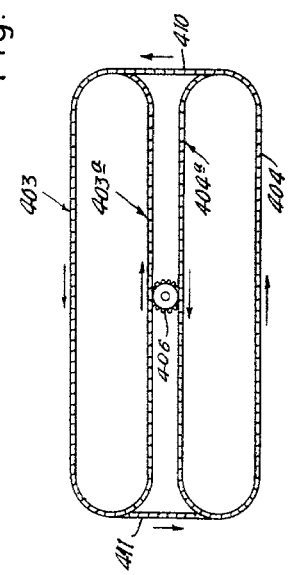
Fig.5
INVENTORS
Harold H. Stewart
Herman S. Johns
BY
ATTORNEY INVENTORS
Howard H. Stewart
Herman S. Johns
ATTORNEYS

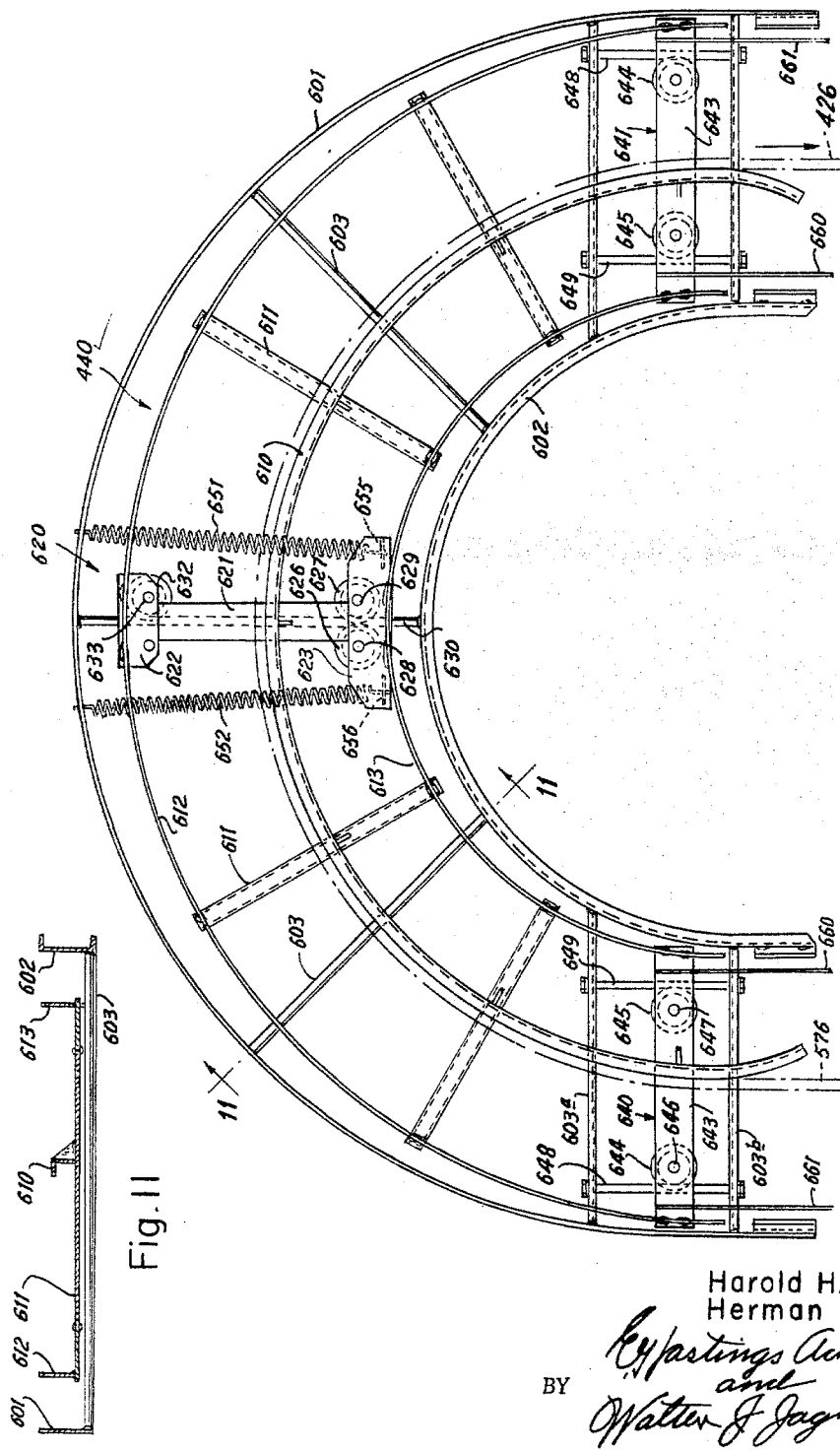

United States Patent Office 3,252,564
Patented May 24, 1966

3,252,564
CONVEYOR SYSTEMS
Harold H. Stewart and Herman S. Johns, Dallas, Tex., assignors to Stewart Engineering & Equipment Company, Inc., Dallas, Tex., a corporation of Texas
Filed June 15, 1962, Ser. No. 202,842
3 Claims. (Cl. 198—208)

This application is a continuation-in-part of the co-pending application, Serial No. 770,117, filed October 29, 1958, now Patent No. 3,094,206.

This invention relates to conveyor systems and more particularly to conveyor systems having a conveyor provided with a plurality of spaced members which provide a support means upon which objects to be transported by the system may rest.

An object of this invention is to provide a new and improved conveyor system.

Another object of the invention is to provide a conveyor system having a conveyor arranged in a plurality of vertically aligned spaced loops wherein the loops are driven by a drive means, such as a plurality of sprockets mounted on a common vertically extending drive shaft rotated by a suitable means.

Another object of the invention is to provide a new and improved conveyor system including a conveyor having a plurality of vertically spaced sets of loops having drive means which are engageable with each of the loops for simultaneously driving all of the loops in order that all portions and sections of the conveyor move smoothly and continuously without undue jolting or vibration.

Still another object of the invention is to provide a conveyor system having a continuous conveyor arranged in a plurality of vertically aligned loops and a single drive means engageable with all of the loops for simultaneously driving all of the loops.

A further object of the invention is to provide a conveyor system including a conveyor having a plurality of vertically spaced loops, each of which is provided with individual tensioning or take up means for maintaining each loop under proper tension wherein the loops are provided with a common drive means at locations relative to the take up means of the conveyor which provide for optimum loading of the take up means.

A still further object is to provide a conveyor system including a conveyor having a pair of sets of vertically aligned spaced loops wherein one set of the loops is disposed within the other set of loops and having drive means engaging adjacent sections of the loops of the two sets of loops for simultaneously driving all the loops.

Another object of the invention is to provide a pair of sets of vertically aligned spaced loops, each set having a separate drive means for moving its loops and the two drive means being simultaneously driven by a common prime mover.

Additional objects and advantages of the invention will be readily apparent from the reading of the following description of a device constructed in accordance with the invention, and reference to the accompanying drawings thereof, wherein:

FIGURE 4 is a perspective view showing a conveyor system wherein the conveyor includes two sets of vertically spaced loops which are driven simultaneously by sprockets, each sprocket engaging adjacent parallel loop portions of the conveyor;

FIGURE 5 is a top plan view of the conveyor illustrated in FIGURE 4;

FIGURE 6 is a vertical view of the drive means of the conveyor system illustrated in FIGURE 4;

FIGURE 10 is a plan view of one of the take-up means of FIGURE 9; and,

FIGURE 11 is a sectional view taken on line 11—11 of FIGURE 10.

Figure 1:
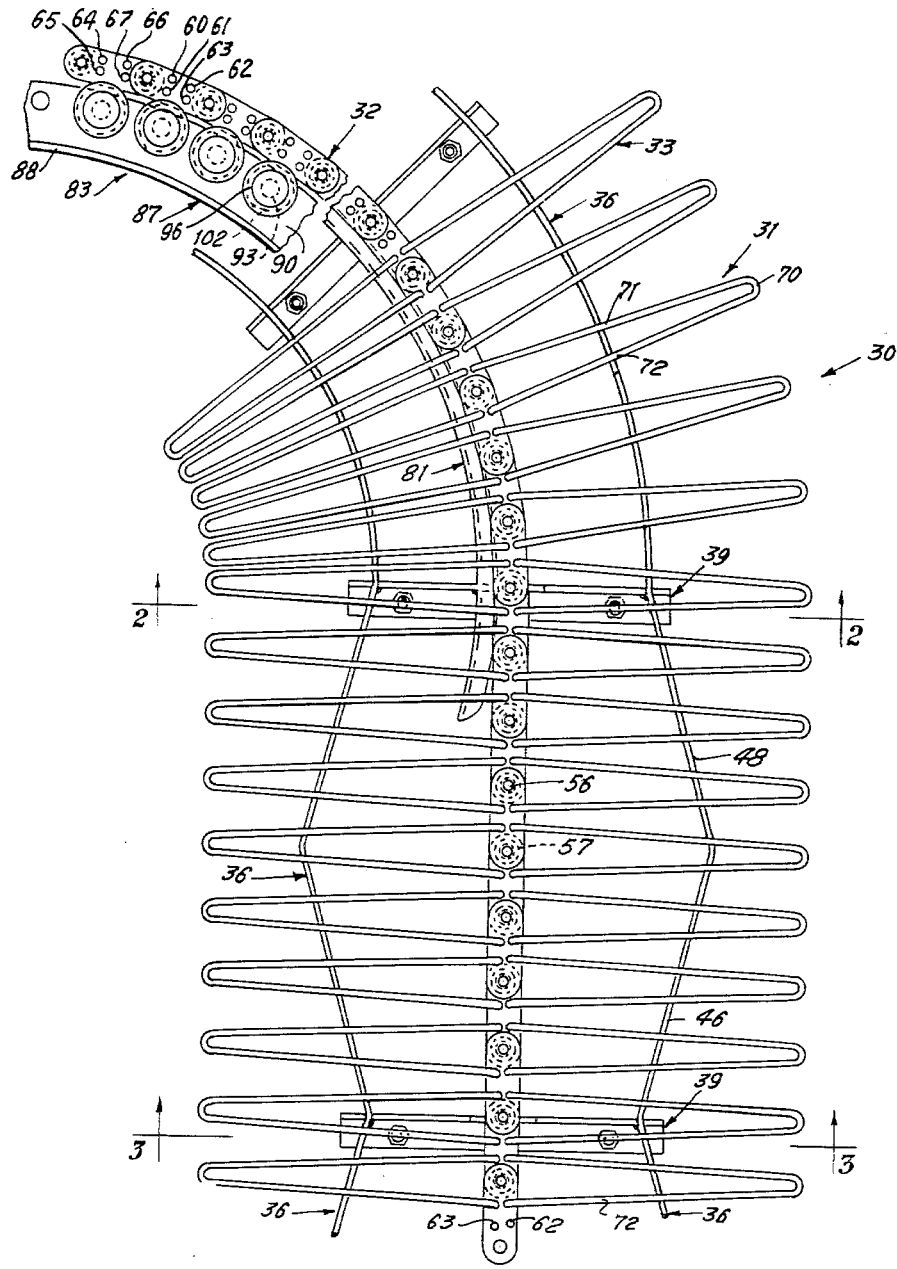
FIGURE 1 is a fragmentary plan view of one form of the conveyor system of the invention.
Figure 2:
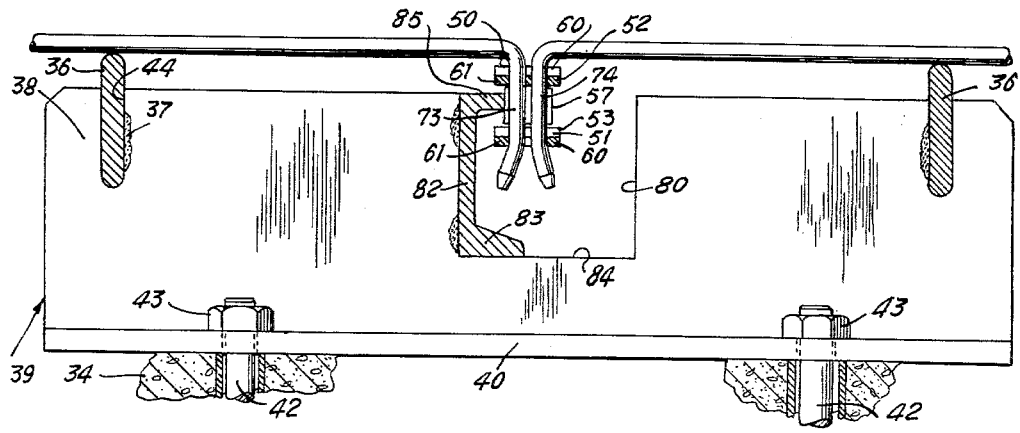
FIGURE 2 is a sectional view taken on line 2—2 of FIGURE 1.
Figure 3:
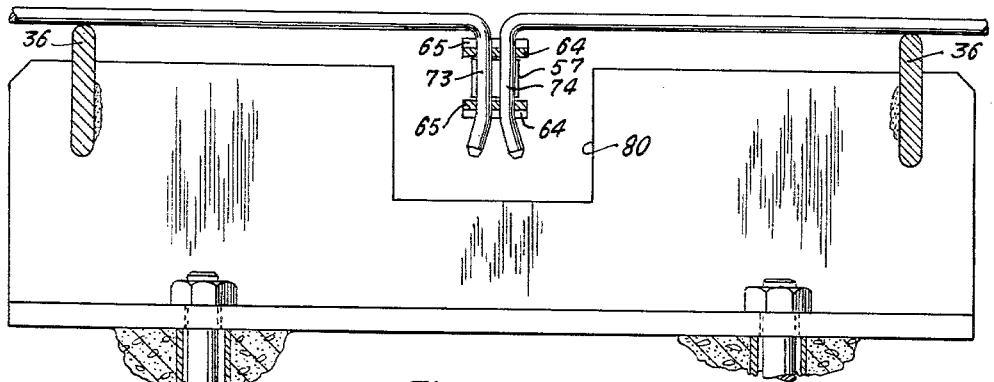
FIGURE 3 is a sectional view taken on line 3—3 of FIGURE 1.

Referring now particularly to FIGURES 1, 2 and 3 of the drawings, the conveyor system 30 here illustrated includes a conveyor 31 comprised of a central flexible or articulated draw member 32 from which the support members 33 extend laterally horizontally. The conveyor is supported on a fixed structure, such as a concrete slab 34, by means of side bars 36 disposed on opposite sides of the draw member. The side bars are rigidly secured, as by welds 37, to the vertical flanges 38 of the angle mounts 39. The horizontal flanges 40 of the mounts are rigidly secured to the supporting structure 34 by bolts 42 which project through appropriate bores in the horizontal flanges and which are provided with nuts 43 on their threaded upper ends.

The side bars 36 may extend through suitable vertical upwardly opening slots 44 in the vertical flanges 38 of the support mounts and are preferably disposed at an angle to the direction of movement of the conveyor in order to spread the wear on the support members 33 over large areas thereof. For example, each side bar 36 may have two sections 46 and 48 which extend laterally outwardly from adjacent support mounts 39.

The draw member 32 may be in the form of a chain having pairs of upper and lower outer links 50 and 51 which are connected by pairs of upper and lower inner links 52 and 53. The links are connected together by pins 56 which extend through aligned vertical apertures in the outer and inner links and through tubular spacer or roller members 57 which are interposed between the inner links. Each of the upper and lower outer links 50 and 51 are provided with four aligned vertical apertures or bores 60, 61, 62 and 63. The inner upper and lower links 52 and 53 are provided with similar vertical aligned bores 64, 65, 66 and 67.

The support members 33 of the conveyor are preferably formed of a single resilient rod or wire member having an outer central bight portion 70 connecting divergent horizontal legs 71 and 72. The horizontal legs have dependent legs 73 and 74 which are provided with angularly downwardly extending end or retainer portions 75 and 76, respectively. The retaining portions are preferably provided with beveled shoulders 78 whereby their insertion in the bores of the links is facilitated.

It will be apparent that the dependent legs 74 and 73 of each support member 33 are so connected to the articulated draw member 32 that one of the dependent legs 73 or 74 extends through a pair of vertically aligned bores in the outer links and its other dependent leg extends through a vertically aligned bore in an adjacent pair of inner links. For example, where a support member has its dependent leg 73 extending through the aligned bores 61 of a pair of outer links, its other dependent leg 74 then extends through the aligned bores 67 of an adjacent pair of inner links. The next support member then has its dependent leg extending through the bores 65 of the same pair of inner links and its leg 74 extending through the vertically aligned bores 63 of the next pair of outer links. In this manner each support member is connected to adjacent inner and outer links on opposite sides of the connecting hinge pins 56 and rollers 57. Pivoting of the inner links relative to the outer links is therefore accomplished against the resilient force of the support members 33, the legs 71 and 72 thereof flexing about bight portions 70 to accommodate such pivotal movement of adjacent links. The draw member 32 and the dependent legs of the support members extend at least partially into upwardly opening slots 80 in the vertical flanges 38 of the support mounts.

Where the conveyor 31 begins change of direction, a vertical arcuate channel guide member 81 is disposed in the slots 80 of the mounts 39 having its web 82 abutting and being welded to one vertical side of the flange defining the slot 80 and having its lower flange 83 resting upon the bottom edge 84 defining the bottom of the slot. The upper flange 85 of the arcuate guide member 82 has its edge in position to engage the rollers 57 of the draw member and thus serves to guide the draw member as it moves past the guide member. The guide surface of the flange 85, of course, is always convexly shaped being disposed on the inner side of any curve around which the draw member 32 moves. An angle guide member 87 is provided where the forces exerted by the draw member are greater. The angle member 87 is secured to the vertical flanges 38 of the support mounts by welding. The vertical flange 88 of the angle member 87 abuts a vertical edge 89 of a notch cut in one side of the vertical flange adjacent the slots 80 and its horizontal flange 90 rests upon the upwardly facing edge 91 defining the lower edge of such notch. The horizontal flange is provided with a plurality of spaced rollers 92, like those shown in FIGURE 5, which are mounted for rotation on pins 93 rigidly secured to the horizontal flange 90. The rollers are held in position for rotatable movement about the pins 93 by ball bearings 94 which are positioned in aligned grooves 95 and 16 of the pins and of the roller, respectively. A cover 96A may be carried by the rollers above the pins 95 to protect the roller bearing connection from dirt and foreign matter. The rollers 92 have an annular external flange 98 which extends between the pairs of upper and lower links and which provides vertical shoulders 101 and 102 which are abutted by the side edges of the outer links 51 and 50, respectively. It will be apparent that the rollers 92 provide a greater support and guidance for the draw member 32 than the channel guide member 82 since they abut the draw member at two fairly widely spaced points and are therefore employed where forces exerted by the draw member against the guide member are relatively great.

The draw member is, of course, endless and may be driven by any suitable drive sprocket means powered by any suitable prime mover, such as an electric motor, in a manner which will be described below.

It will further be seen that the conveyor 31 is light in weight and may be easily lifted from the support mounts for cleaning and repair since it is not in any way fastened or secured to the supporting structure other than as it may be secured thereto by the drive sprockets which are to be described below.

In FIGURES 4, 5 and 6 is illustrated schematically a drive means for a conveyor system having a conveyor which has a pair of vertically spaced sets of loops. The conveyor system 400 includes a draw member 402 which has two sets of vertically spaced loops 403 and 404. The loops 403 and 404 have parallel adjacent sections 403a and 404a so that the sprockets 406 on the drive shaft 407 of a prime mover 408, such as an electric motor, may simultaneously engage horizontally and vertically aligned pairs of loop sections 403a and 404a, so that all loops of the conveyor are driven simultaneously. The conveyor of course is of the endless type so that the uppermost loop 404 is connected by the conveyor section 410 to the uppermost loop 403 and in a similar way, the lowermost loop 403 is connected by a section 411 of the conveyor to the lowermost loop 404. It will be understood of course that all sections of the conveyor move simultaneously and that suitable guides are provided at every point where the conveyor loops change direction either vertically or horizontally as was more fully explained above. The provision of a drive means which includes a plurality of sprockets mounted on the same drive shaft and each of which simultaneously engages the draw member of adjacent loops of the conveyors insures that there is no backlash in the conveyor and that all portions and sections of the conveyor move smoothly and continuously without undue jolting or vibration.

Figure 7:
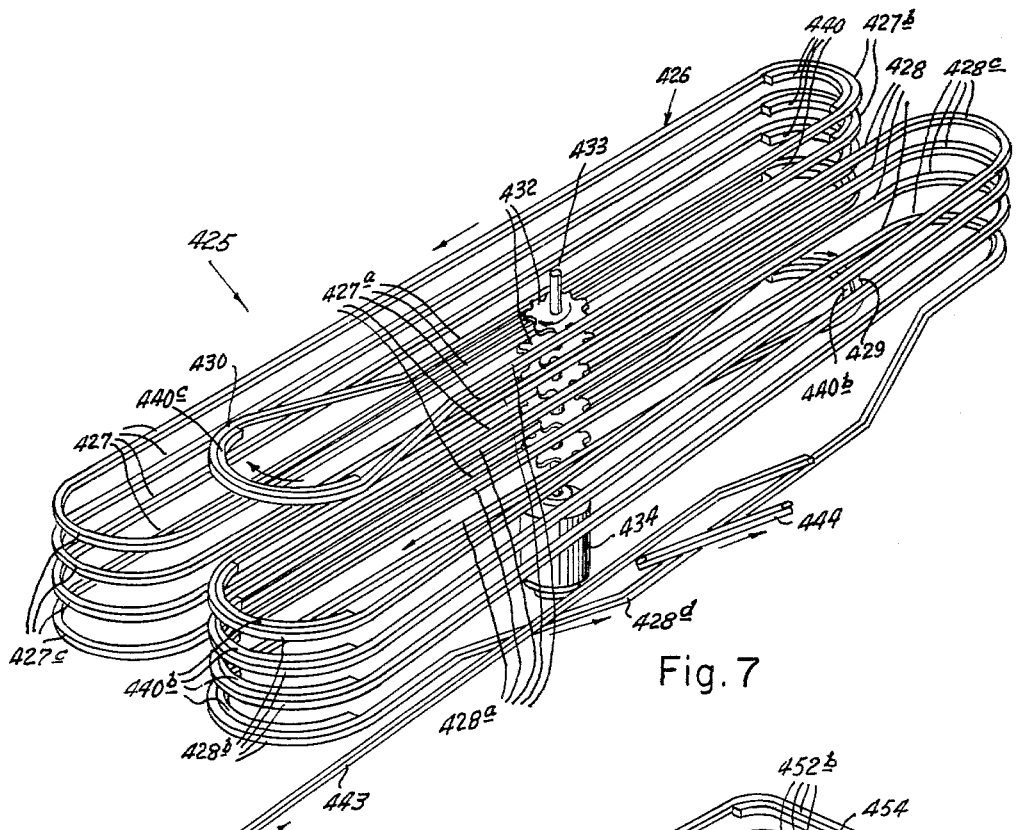
FIGURE 7 is a perspective schematic view showing another conveyor system including a conveyor having two sets of vertically spaced loops.

In FIGURE 7 is illustrated schematically another conveyor system 425 whose conveyor includes a continuous draw member 426 which has two sets of vertically spaced loops 427 and 428. The end of the lowermost loop 428 is connected to the end of the lowermost loop 427 by a curved connector and direction reversing section 429 while the end of the uppermost loop section 428 is connected to the end of the uppermost loop 427 by a curved connector and direction reversing section 430. The loops 427 and 428 have parallel adjacent sections 427a and 428a so that the sprockets 432 on the drive shaft 433 of a prime mover 434 may simultaneously engage horizontally and vertically aligned pairs of loop sections 427a and 428a whereby all loops of the conveyor are driven simultaneously and therefore at equal speeds in the direction indicated by the arrows.

Each loop 427 is maintained under desired tension by a tensioning or take-up means 440, which will be described in detail below, which engages the curved section 427b thereof. Similarly each of the loops 428 is individually maintained under proper tension by a similar tensioning member 440b which engages and supports the draw bar member at the curved sections 428b thereof. The curved sections 427c and 428c of the loops are held against movement toward the sections 427b and 428d by fixed guide members. The direction reversing sections 429 and 430 are similarly maintained under tension by the tensioning or take-up means 440b and 440c, respectively.

The articles which are to be moved by the conveyor system may be loaded on the conveyor at the section 428d of the lowermost loop 428 by a suitable load on means 443 and the articles may be removed from the conveyor by a suitable load off means 444 located before the load on means so that the articles which have moved throughout the path formed by the loops 428 and 427 are removed from the conveyor at the section 328d to clear the conveyor and permit the placement on the conveyor of other articles which are also to make this journey. The load on means 443 may be any suitable type of conveyor and the load off means may also be any suitable type of conveyor disposed above the section 428d and having a slide plate (not shown) onto which the articles slide off the conveyor as the conveyor moves therepast.

In order to prevent overloading of the tensioning or take-up means 440 and to provide the most efficient operation of the conveyor, sprockets 432 which drive the loops are mounted on the "upstream" side of the direction of movement of the conveyor relative to the curved sections of the loops which are engaged by the tensioning or take-up means so that the sprockets drive the sections 427a and 428a of the draw member in each instance toward the curved sections of the loops engaged by such tensioning or take-up means.

Figure 8:
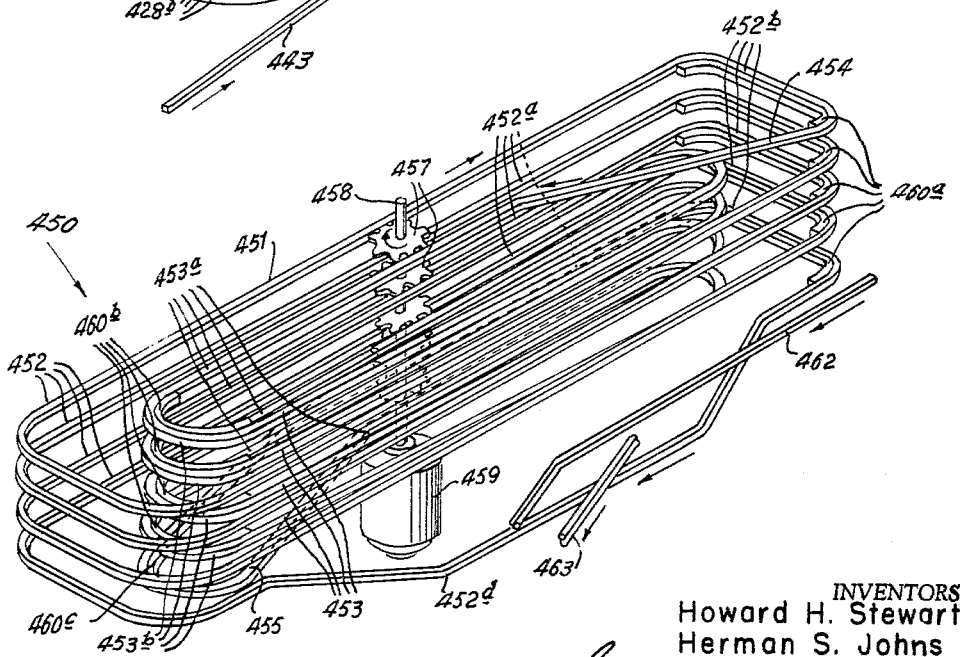
FIGURE 8 is a perspective schematic view showing another conveyor system including a conveyor having two sets of vertically spaced loops wherein one set of loops is disposed within the other set of loops.

In FIGURE 8 is illustrated schematically another conveyor system 450 whose continuous draw member 451 has two sets of vertically spaced loops 452 and 453. The set of loops 453 is disposed within the outer set of loops 452. The end of the uppermost loop 452 is connected to the end of the uppermost loop 453 by the connector section 454 while the end of the lowermost loop 453 is connected by a connection section 455 to the end of the lowermost loop 452. The loops 452 and 453 of the drive member have parallel adjacent sections 452a and 453a in order that the sprockets 457 mounted on the drive shaft 458 of a prime mover 459, such as an electric motor, may simultaneously engage horizontally and vertically aligned pairs of the loop sections 452a and 453a. All loops of the conveyor are thus driven simultaneously at the same speed by the drive means. The loops 452 are maintained under proper tension by the tensioning or take-up means 460a which engage the arcuate sections 452b of the loops 452 and similar take-up means 460b engage the arcuate sections 453b of the loops 453 to maintain these loops under proper tension. The curved portion of the connector section 455 is similarly maintained under tension by a tensioning or take-up means 460c. The lowermost loop 452 may have a section 452d on which the articles to be carried by the conveyor system in the path defined by the loops 452 and 453 may be loaded by a suitable load on means 462 and from which the articles carried by the conveyor may be unloaded by a suitable unloading means 463.

It will be noted that in the conveyor system 450, as in the conveyor system 425, the sprockets are located "upstream" of the loops which are placed under tension by the tension or take-up means so that the sprockets drive the sections 452a and 453a toward the take-up means.

It will also be noted that the set of loops 453 is disposed within the set of loops 452 to obtain optimum utilization of the available space for a given length of path of travel of the conveyor.

It will now be seen that the conveyor systems illustrated in FIGURES 4 through 11 each includes a conveyor having a continuous draw member arranged in at least one set of vertically spaced loops which are simultaneously driven by a common drive means at equal speeds to cause all loops of the conveyor to move smoothly and without any jarring or backlash.

It will also be seen that the drive means which engage the loops are disposed as close as possible to the arcuate sections which are engaged by tensioning or take-up means in order that a minimum load be imposed on the take-up means. For example in the conveyor systems 425 of FIGURE 7 and the conveyor system 450 of FIGURE 8, the drive means or sprockets are positioned equidistant between the arcuate sections which are held against movement by a rigid guide means and the arcuate sections which are engaged by the tensioning or take-up means since each sprocket simultaneously engages and drives the adjacent straight sections of the two sets of loops and the arcuate sections of the two sets of loops are disposed oppositely relative to each other. Similarly, the sprockets or drive means of the conveyor system 475 illustrated in FIGURE 37 are positioned at equal distances between the two opposite arcuate sections of each loop since each loop is provided with tensioning or take-up means at both opposite ends thereof.

It will further be seen that the two sets of vertically spaced loops may be spaced from one another or that one set of vertically spaced loops may be disposed within the other set of loops as in the conveyor system 450 of FIGURE 8.

Figure 9:
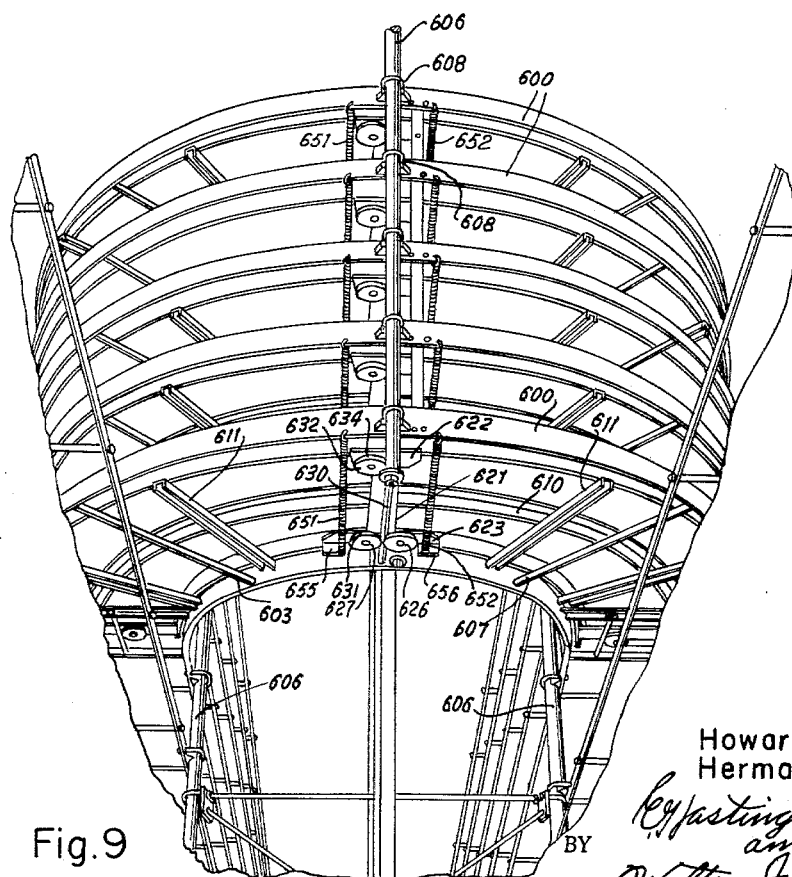
FIGURE 9 is a fragmentary sectional view showing the manner in which the tensioning take-up means of loops of the conveyor are mounted to a supporting structure.

In FIGURES 9, 10 and 11 is illustrated a suitable tensioning or take-up means for engaging the arcuate sections of the loops of a set of vertically spaced loops of a conveyor system as, for example, the take-up means 440 for the arcuate sections 427b of the loops 427 of the continuous draw member 426 of the conveyor system 425 of FIGURE 7. Each of the tensioning or take-up means 440 is normally mounted on a fixed support frame 600 having an outer arcuate support member 601 and an inner arcuate support member 602 which are rigidly connected by the connector bars 603. The connector bars may be connected to the inner and outer arcuate support members 601 and 602 in any suitable manner as by welding.

The support frames 600 for the take-up means for the vertically spaced loops may be rigidly supported in vertically spaced relationship to one another by any suitable support means, as by the vertical support members 606, whose upper ends are secured to an upper rigid structure by means of the U-shaped bolts or clamps 608 illustrated in FIGURE 9. The tensioning or take-up means includes an arcuate angle shaped guide member 610 whose vertical flange rests upon and is rigidly secured to the connector bar 611 which is also rigidly secured to the outer and inner arcuate side bars 612 and 613, respectively, upon which the support members 615 of the conveyor rest and slide. The draw member 426 of the conveyor engages the edge of the horizontal upper flange of the arcuate guide member 610.

The tensioning or take-up means 440 also includes a central sheave assembly 620 which includes a bar 621 to which the arcuate guide member 610 is secured at an intermediate point thereof, as by welding, and a pair of plates 622 and 623 rigidly secured to the outer and inner side bars 612 and 613, respectively, in any suitable manner, as by welding. The plates 622 and 623 are secured to opposite ends of the bar 621 by welding. The sheave assembly also includes a pair of support sheaves 626 and 627 rotatably mounted, as by the shafts 628 and 629, respectively, to the inner plate 623. The sheaves have peripheral grooves 631 in which is received the support bar 630 of the support frame. A similar sheave 632 is rotatably mounted on the outer plate 622 by means of the shaft 633 suitably journalled in the outer plate 622. The connector bar 630 of the support frame engages in the peripheral groove 634 of the sheave 632. The sheave 632 and the sheave 627 are provided to resist any lateral forces imparted to the take-up means due to the movement of the draw bar member in the direction indicated by the arrow. The tensioning or take-up means is also provided with side sheave assemblies 640 and 641, each of which includes a bar 643 on which are rotatably mounted outer and inner sheaves 644 and 645 by means of the shafts 646 and 647, respectively. Each outer sheave is provided with a peripheral groove in which is received an outer support bar of the support frame 600 which extends between and is rigidly connected to the support bars 603a and 603b. Each inner sheave 645 similarly has a peripheral groove in which is received an inner support bar 649 which extends parallel to the support bar 648 and is also rigidly connected to the connector bars 603a and 603b of the support frame. The outer and inner side bars 612 and 613 and the arcuate guide member 610 are rigidly connected to the bar 643 in any suitable manner as by welding.

It will now be apparent that the sheaves 644 and 645 support the ends of the tensioning or take-up means 588 and permit longitudinal movement of the tensioning or take-up means on the support frame 600 but at the same time prevent any lateral movement thereof relative to the support frame.

The tensioning or take-up means is biased in a direction to impose a tension on the draw bar member by means of the tension springs 651 and 652 whose outer hooked portions are secured to the outer arcuate support member 601 of the support frame by extension through suitable apertures thereof. The inner hook end portions of the springs 651 and 652 are similarly secured to the dependent legs or extensions 655 and 656, respectively, of the inner plate 623 of the central sheave assembly 620.

It will therefore be apparent that the assembly of the arcuate guide member and the side bars is yieldably biased outwardly relative to the support frame to maintain the draw member 426 under a predetermined tension.

The inner and outer side bars 660 and 661 for supporting the support members 615 of the conveyor may also have their ends secured to the plate 643 of the end sheave assemblies 640 and 641. Such side bars 660 and 661 of course are mounted on other suitable supporting structure of the conveyor system for longitudinal movement relative thereto in order to permit such longitudinal movement of the tensioning or take-up means.

While a particular type of tensioning or take-up means has been illustrated and described, it will be apparent that various different types of take-up means well known to those skilled in the art may be employed in place of the take-up or tensioning means 440, illustrated and described, to maintain the draw member of the conveyor under proper tension.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A conveyor system comprising: a conveyor; guide means for guiding said conveyor in a plurality of loops arranged in two sets of aligned vertically spaced loops, said guide means comprising a plurality of pairs of arcuate end sections, each of said loops having arcuate end sections guided by said end sections of said guide means and straight parallel side sections; tensioning means for one of each pair of said guide means arcuate end sections yieldably biasing said one arcuate end section from the other end section of each pair of said arcuate end sections for holding said loops under tension, each pair of aligned loops of said two sets of loops having adjacent side sections moving in opposite directions; and drive means extending between and engaging said adjacent sections of said pairs of loops for simultaneously driving all loops of said conveyor, said conveyor having a draw member, said drive means comprising a shaft and a plurality of sprockets disposed in vertically spaced relationship on the drive shaft, each sprocket engaging said draw member at said adjacent sections, said sprockets moving said adjacent side sections of said loops toward said tensioning means.

2. The conveyor system of claim 1, wherein the end of the lowermost loop of one of said sets of loops is connected to the end of the lowermost loop of the other of said set of loops and the end of the uppermost loop of said one of said sets of loops is connected to the end of the uppermost loop of the other of said sets of loops.

3. The conveyor system of claim 1, wherein said arcuate sections of one of said sets of loops engaged by said guide means arcuate end sections biased by said tensioning means are disposed remote from said arcuate sections of the other set of said loops engaged by said guide means arcuate end sections biased by said tensioning means.

References Cited by the Examiner

UNITED STATES PATENTS

| | | | |
|---|---|---|---|
| 615,358 | 12/1898 | Lynch | 198—159 |
| 1,614,056 | 1/1927 | Agars | 198—159 |
| 2,870,902 | 1/1959 | Rada | 198—159 |

FOREIGN PATENTS

| | | |
|---|---|---|
| 536,037 | 3/1955 | Belgium. |
| 177,754 | 3/1958 | Russia. |

SAMUEL F. COLEMAN, *Primary Examiner.*

WILLIAM B. LA BORDE, *Examiner.*

R. E. AEGERTER, *Assistant Examiner.*